United States Patent

Schurch

[15] 3,670,659
[45] June 20, 1972

[54] TRANSPORTATION INSTALLATION

[72] Inventor: Eugen Schurch, Gerlafingen, Switzerland
[73] Assignee: Von Roll AG, Gerlafingen, Switzerland
[22] Filed: April 14, 1970
[21] Appl. No.: 28,440

[30] Foreign Application Priority Data

April 17, 1969 Switzerland ..................... 5816/69

[52] U.S. Cl. ................... 104/101, 104/96, 104/130
[51] Int. Cl. ............................................. E01b 25/26
[58] Field of Search ............. 104/96, 101, 130, 131

[56] References Cited

UNITED STATES PATENTS

| | | | |
|---|---|---|---|
| 3,313,243 | 4/1967 | Lauber | 104/101 |
| 1,373,637 | 4/1921 | Riblet | 104/101 |
| 2,511,027 | 6/1950 | Wekner | 104/101 |
| 2,535,541 | 12/1950 | Le Fiell | 104/101 |
| 884,594 | 4/1908 | Lacomme | 104/131 |
| 631,687 | 8/1899 | Whaley | 104/101 |

*Primary Examiner*—James B. Marbert
*Assistant Examiner*—D. W. Keen
*Attorney*—Werner W. Kleeman

[57] ABSTRACT

A transportation installation incorporating a horizontal and/or vertical and/or inclined extending track rail equipped with at least one rail member, along which there can travel a number of transportation or conveying units having a drive means and devices for receiving loads. The track rail possesses branching points equipped with switch or routing means. The switch or routing means incorporates a movable portion embodying linear and/or curved connection rail pieces for the track rail which, with respect to their position and their rail surfaces as well as also their planes perpendicular to such rail surfaces and containing the rail axes deviate from one another.

12 Claims, 27 Drawing Figures

PATENTED JUN 20 1972   3,670,659

INVENTOR
Eugen Schwach

BY *Hanns H. Kleeman*

ATTORNEY

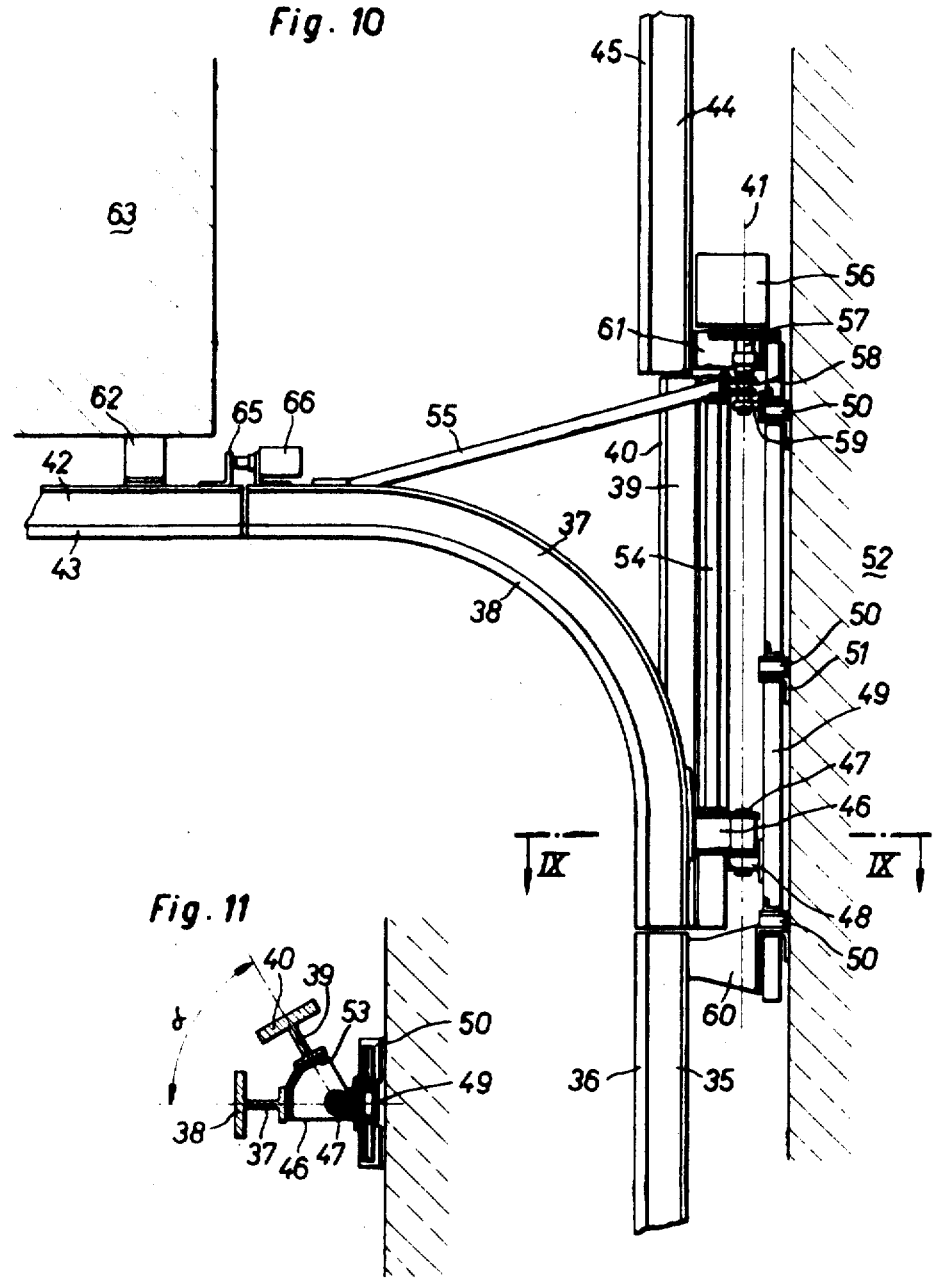

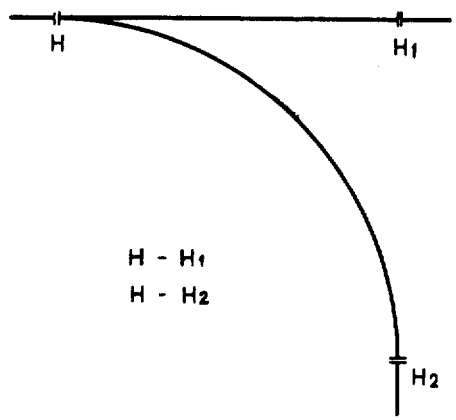
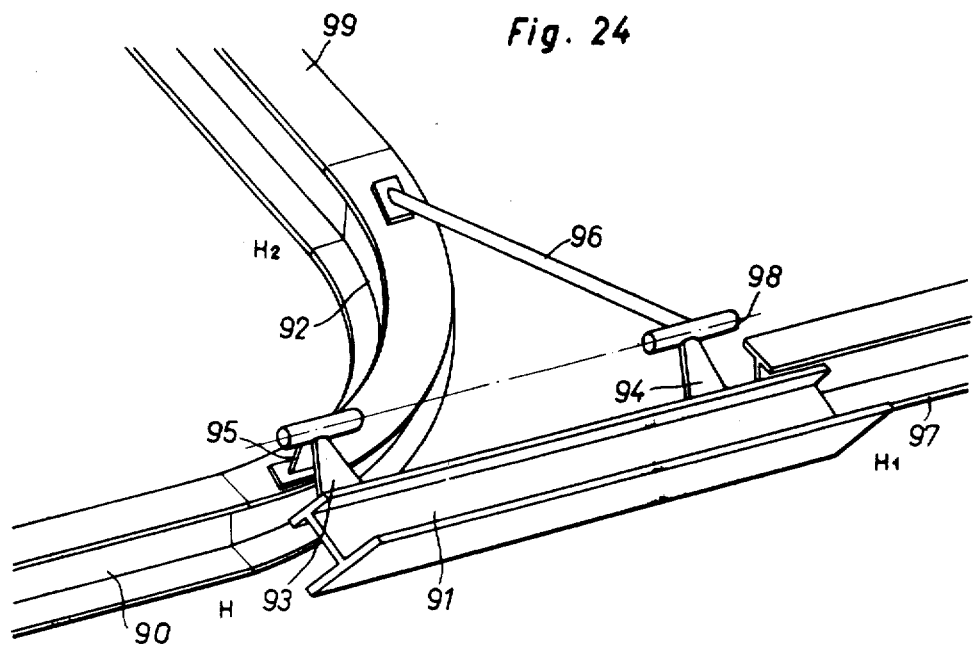

TRANSPORTATION INSTALLATION

BACKGROUND OF THE INVENTION

The present invention relates to a new and improved transportation installation incorporating a rail track which extends horizontally and/or vertically and/or at an inclination and is equipped with at least one rail, along which rail track there can travel a number of transportation or conveying units possessing a drive and devices for receiving loads, the transportation installation also having branch points with switch or routing means.

Transportation installations of the aforementioned general type are well known to those versed in the art. By way of example, there is mentioned the so-called prior art single rail transportation installation. In this arrangement the rail tracks consist of profile members, for instance possessing a double-T-profile, one flange of which is employed as the traveling rail and the other flange of which is used for attachment of the rail track to support means, carriers, walls and the like. Transport or conveying units move upon the rail flange. Such transport or conveying units are guided by means of at least a pair of traveling wheels or rollers at the rail flange, and furthermore, possess suitable devices for receiving loads. The transport or conveying units are either equipped with their own drive mechanism, typically consisting of an electric motor and a reduction gearing, by means of which a traveling wheel or a special drive wheel of the transport unit moves along the rail track, or else, the drive mechanism can be arranged externally of the transport unit.

The rail tracks can be arranged upon a horizontal plane if, for instance, they are laid in a hall, or also, if they are laid in a multiple-story building, can extend vertically and/or at an inclination. In the case of vertical tracks there are usually provided further pairs of traveling wheels, for instance situated at two oppositely disposed sides of the rail flange. This ensures for proper guiding of the transport or conveying units in all positions. The continuous movement of the transport units, also in this arrangement, occurs by means of a drive wheel which is designed in such a way that the transmission of force onto the rail can be carried out even with a different rail arrangement than horizontal. Of course, the transport or conveying units must equally be equipped with devices for receiving the loads for vertical transportation thereof, in other words, for conveying such loads in a direction which deviates from the horizontal.

In order to distribute the loads at different predetermined destinations within such an installation, it is known to provide switch or routing means. The latter enable setting up the desired rail connection prior to arrival of the transport unit so that this transport unit can pass through without stopping. Now, as far as the structure of the switching or routing means is concerned, different physical manifestations are well known to the art. For instance, the tongue-type switch possesses a single movable connection rail member, whereas with the rotary-type switch or sector turntable and with the slide-type switch there must be provided as many movable connection rail members as there are branch or junction points, with the desired connection member being placed into its operating position through the performance of a rotary or sliding movement. Further types of switch or routing means are, by way of example, the cross switch and the switch having two rails, wherein the first rail is employed at the point of intersection of two rail tracks and the second rail is employed for the simultaneous connection of two rails, for instance a departure rail and an arrival rail.

It is a characteristic of the known switches that they cannot, or only to a limited extent, be arranged at rail tracks which extend other than in horizontal direction. For instance, if a known rotary-type switch is vertically installed, then, indeed, the switch position would also function in this arrangement where there is no change in direction. However, if there is to be adjusted a different switch position with a change in direction, for instance from the vertical into the horizontal, then the rail surfaces should likewise be horizontal after the transition to the horizontal rail. Under the expression "rail or track surface" there is to be understood an imaginary surface which passes through the contact point or track of the supporting traveling rollers upon the rail. In the case of horizontal or vertically disposed rail tracks, the track surface defines a horizontal or vertical plane, respectively. In the case of the previously mentioned double-T-profile, the flange (traveling-flange) serving as the rail is situated in the rail or track surface. When employing the heretofore defined expression "rail or track surface," with the known switches, if they are arranged in vertical position, the rail surfaces defining a vertical plane would also be a vertical plane after transition of the track into the horizontal. Basically, the transport or conveying units and the devices for receiving the loads could be designed for such a case, but the expenditure would be relatively great and the solution would not be a really clean one. It is for these reasons that it is known to employ for vertical tracks so-called sliding platforms and to undertake the change in direction in front of or after same at the individual tracks. However, the drawback of the sliding platform arrangement resides in the fact that the transport or conveying units must first travel onto the sliding platform, thereafter must stop thereat (with the exception of throughpassing tracks) and only after displacing the sliding platform can such transport unit continue to travel.

SUMMARY OF THE INVENTION

Accordingly, it is a primary objective of the present invention to provide an improved transportation installation which effectively overcomes the aforementioned drawbacks and disadvantages of the prior art constructions.

Another, more specific object of the present invention relates to an improved transportation installation which contemplates a novel arrangement and construction of switch means for vertical and/or horizontal and/or inclined rail tracks of such transportation installation without experiencing the previously described disadvantages.

Still a further significant object of the present invention relates to an improved transportation installation which is relatively simple in construction, extremely reliable in operation, not readily subject to breakdown, and can be used with most any desired position of the rail tracks of the transportation installation.

Now, in order to implement these and still further objects of the invention, which will become more readily apparent as the description proceeds, the transportation installation of the present invention contemplates providing the movable portion or member of the switch means with linear and/or curved connection rail pieces or rail tracks which, with respect to their position as well as their track surfaces and also their planes containing the track axes and perpendicular to said rail surfaces deviate from one another.

In order to define the switch means for the transportation installation of the present invention and to differentiate such with respect to the known constructions, there are used herein the expression "rail or track surface" as previously explained, and the expression "the planes containing the rail axes." Starting with the rail surface the plane which perpendicularly intersects the rail surface and the rail axis—for instance in the case of the already mentioned double-T-profile where there are present two contact tracks of the traveling rollers upon the traveling flange and the rail axis is situated in the middle between both contact tracks—contains the plane formed by the web of the double-T-profile which is situated perpendicular to the rail surface formed by the contact tracks.

BRIEF DESCRIPTION OF THE DRAWINGS

The invention will be better understood and objects other than those set forth above, will become apparent, when consideration is given to the following detailed description thereof. Such description makes reference to the annexed drawings wherein:

FIG. 1 is a schematic side view of a vertically arranged switch means in a position in which the transport vehicle is guided from the vertical rail to the horizontal rail and visa versa;

FIG. 2 is a plan view of the switch position depicted in FIG. 1;

FIG. 3 illustrates the same side view as shown in FIG. 1, however in a switch position in which the vehicle can travel upon the vertical rail;

FIG. 4 is a side view of the switch means depicted in FIG. 3, viewed in the direction of the arrow IV of FIG. 5;

FIG. 5 is a plan view of the switch position depicted in FIG. 3;

FIG. 10 is a side view of the switch means depicted in the arrangement of FIG. 1, but further showing the accessory equipment required for its proper functioning;

FIG. 11 is a horizontal sectional view of the arrangement shown in FIG. 10, taken substantially along the line IX—IX thereof;

FIG. 24 is a similar representation of the switch means of FIG. 23, yet with the curved connection piece shown in its operational position;

FIG. 25 is a schematic representation of the throughpassage possibilities for the switch arrangement of FIGS. 23 and 24;

DETAILED DESCRIPTION OF THE PREFERRED EMBODIMENTS

Figure 6:
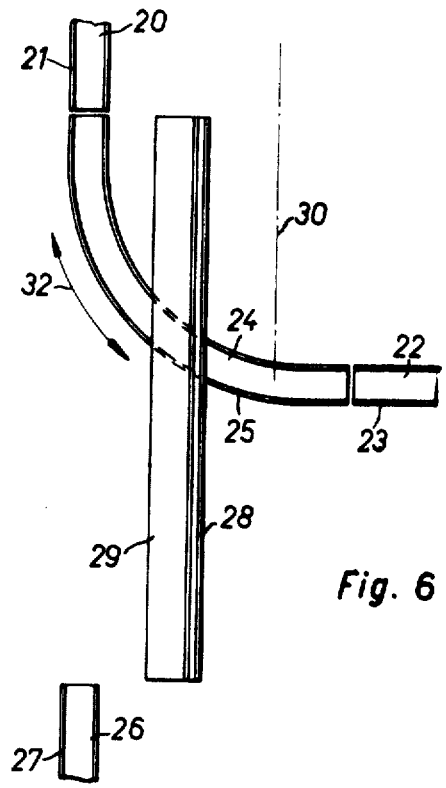
FIG. 6 is a schematic side view of a further vertically arranged switch or routing means in a switch position in which the vehicle can travel from the vertical rail onto the horizontal rail and vice versa.
Figure 7:
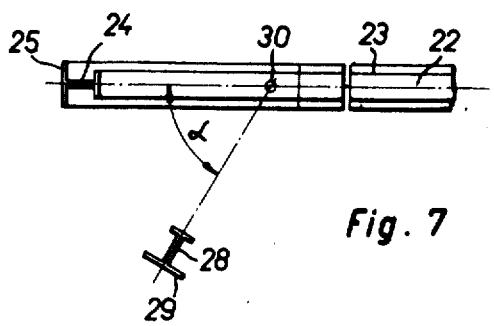
FIG. 7 is a plan view of the switch position depicted in FIG. 6.
Figure 8:
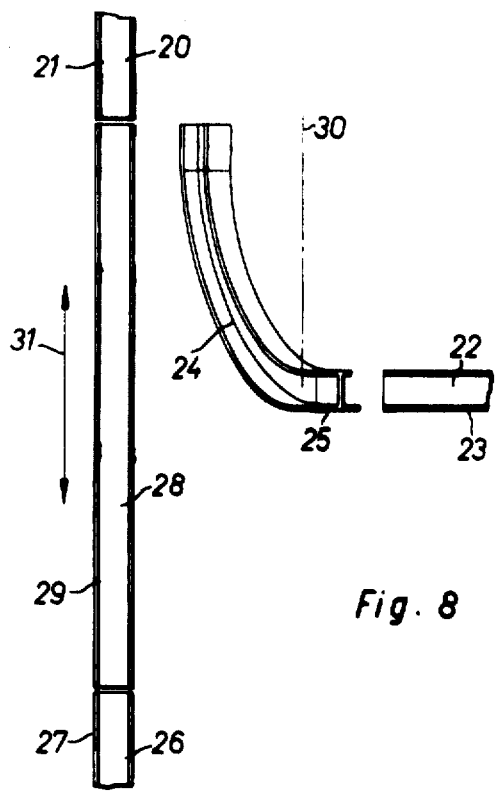
FIG. 8 is the same side view of the switch means shown in FIG. 6, yet in a position of such switch means where the vehicle can travel through upon the vertical rail.
Figure 9:
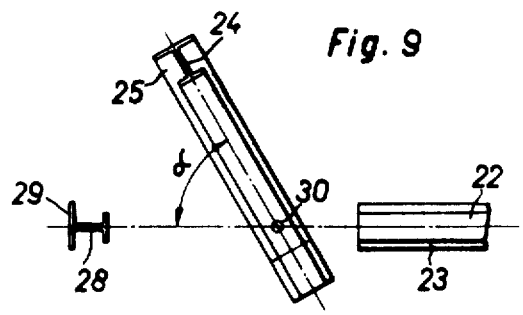
FIG. 9 is a plan view of the position of the switch means depicted in FIG. 8.

Describing now the drawings, in the arrangement of transportation installation depicted in FIGS. 1-5 inclusive, there is schematically illustrated a switch or routing means of such transportation installation which is installed at a rail track. Generally speaking, such will be seen to be comprised of a vertical rail or strand and a horizontal rail or strand, which possess a double-T-profile with unequal size flanges, the wider flange of which defines the rail for the traveling transport or conveying unit and also the rail surface. More specifically, now, it will be understood that reference numeral 1 designates the lower vertical rail strand or track having the rail flange 2, the ends of which define the branch point of the switch means. From this location, there can be carried out the selective throughpassage of the transport or conveying unit at one of the two branches, namely onto an upper vertical rail strand or track 3 or onto a horizontal rail strand or track 4. Both of these rail tracks 3 and 4 possess rail surfaces 5 and 6, respectively. Now in order to select a given throughpassage path one of both movable connection members 7 and 8, possessing the rail surfaces 9 and 10, respectively, is pivoted in such a manner until it aligns with the rail 1, on the one hand, and one of both rails 3 or 4. In so doing, either the rail flanges 2, 9 and 6 or the rail flanges 2, 10 and 5, respectively, form a continuous or throughpassing rail track. The double-headed arrows 12 and 13 denote the different possible throughpassage directions for the relevant switch positions.

The pivot axis 11 of the movable portion or member of the switch means possessing both of the connection members 7 and 8 will be seen to extend substantially parallel to the vertical rail. Furthermore, both connection members 7 and 8 of the switch enclose an angle $\alpha$ with respect to the planes perpendicular to the rail surfaces and taken through the axes of the rails. Considering now the rail surfaces of both connection members 7 and 8, it will be observed that the rail surface of the connection member 7 is curved and that of the connection member 8 is planar or flat, whereby such rail surfaces cannot be brought into coincidence. This is essential for the switch means. On the other hand, with the known horizontally installed switch means the rail surfaces of the connection members are located in one and the same plane. The pivot axis need not extend parallel to the vertical track or rail, rather can be optionally oriented with respect thereto. The position of the pivot axis—and this is true for all of the herein described switch or routing means—is advantageously chosen such that the connection members can assume their operational position without obstruction and do not pass too close to one another.

Figure 26:
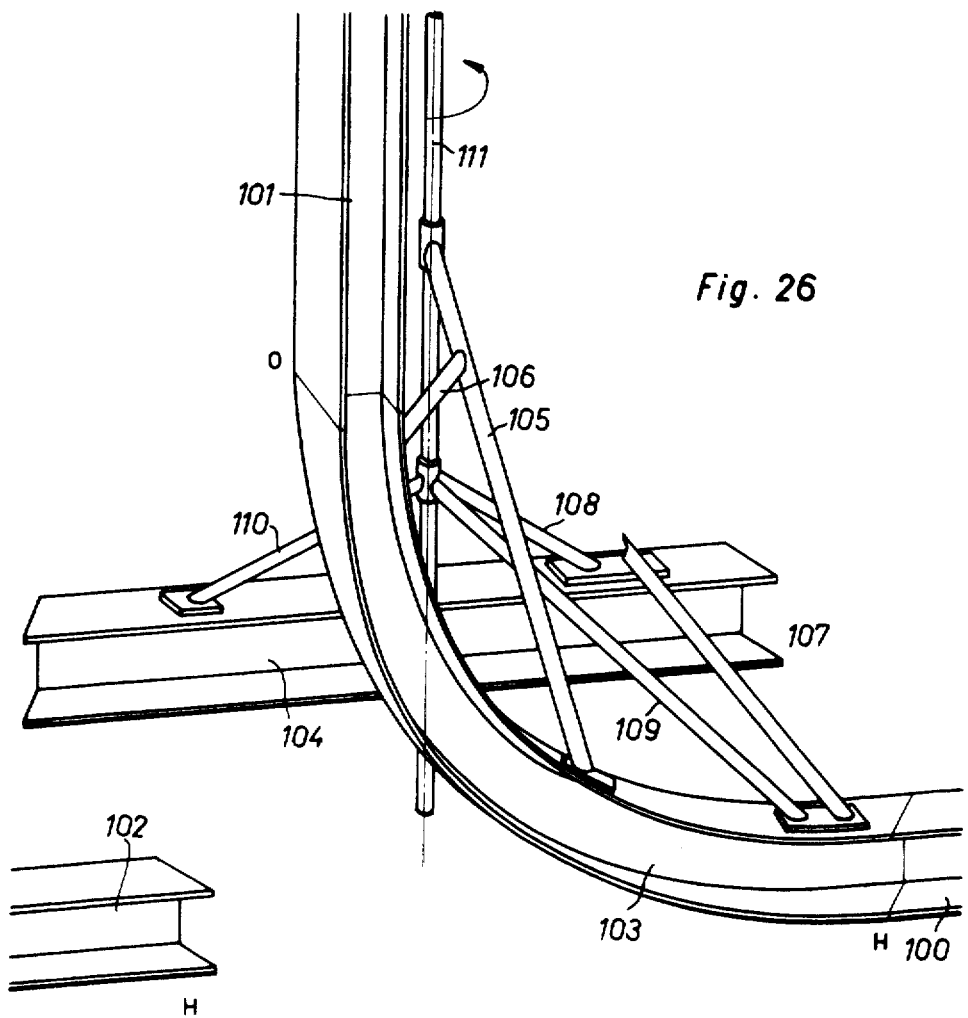
FIG. 26 is a schematic, perspective view of a switch means incorporating two connection members rotatable about a vertical axis, with the curved connection member being located in its operational position.
Figure 27:
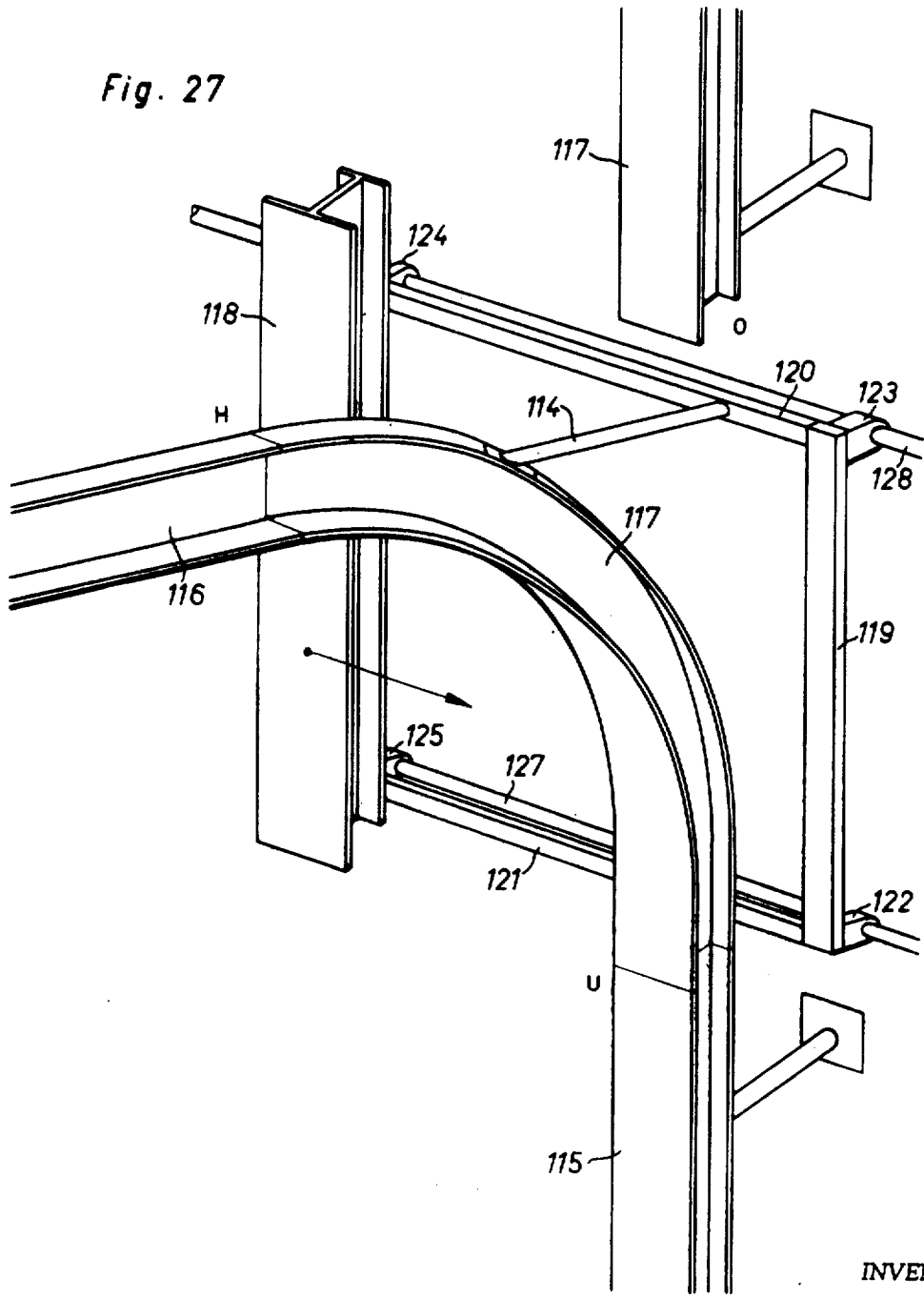
FIG. 27 is a schematic, perspective illustration of a sliding-type switch means possessing two movable connection members, with the curved connection member being located in its operational position.

Instead of employing the pivotable mounting arrangement heretofore considered, it is also possible for the connection members with the movable portion of the switch means to be arranged either displaceably or rotatably, as such will be more fully considered and described with respect to the embodiment of the invention depicted in FIGS. 26 and 27. Whether the movable portion of the switch means is pivotable, slideable or rotatable, depends upon a number of different factors, for instance upon costs, space requirements, and the like. Generally, for a switch arrangement where the movable portion is constructed to be pivotable, and which thus can be conveniently referred to as a rocking or oscillating switch means, the space requirements are small and the drive mechanism simpler, and therefore, such switch means is more economical.

FIGS. 6 through 9 inclusive depict a further embodiment of inventive switch means for a transportation installation of the type described. It will be seen that the switch means is disposed in a vertical arrangement in which the branch or junction point is located at the end of the upper vertical track 20. From this location, the throughpassage of the conveying car or transport unit can be selectively carried out either to a horizontal track 22 via the connection member 24 or onto the lower vertical track 26 via the connection member 28. With throughpassage of the transport unit or car along the horizontal rail or track 22, the track flanges 21, 25 and 23 are in operable communication or connection with one another, whereas for the throughpassage of the transport car onto the lower vertical track 26 the track flanges 21, 29 and 27 are in alignment. Here also, and similar to the arrangement previously discussed with regard to FIGS. 1-5, both movable connection members 24 and 28 are pivotable or rockable about a vertical axis. Furthermore, an angle $\alpha$ is enclosed between the perpendicular planes through the respective track surfaces, this angle being selected to be advantageously less than 90° so that, on the one hand, there is achieved a smaller space requirement with sufficient spacing of such connection members 24, 28 from one another, and, on the other hand, in order to decrease the time required for positioning such connection members.

FIGS. 10 and 11 depict a complete switching arrangement or routing means designed according to the present invention, which is vertically installed and embodying the principal constructions of equipment depicted and described in connection with FIGS. 1-5. More precisely, it will be recognized that the lower vertically extending track 35 having the track flange 36 forms at its illustrated end the branch point or location at which selectively a connection member 37 possessing the rail or track flange 38 or a connection member 39 possessing the track flange 40 can be pivoted or rocked-in to assume the desired position, by rocking or pivoting such respective members about the pivot axis 41. The connection member 37 renders possible the throughpassage of the transport unit or conveying car to the horizontally extending track 42 having the track flange 43, whereas the connection member 39 renders possible the throughpassage of such car onto the upper vertical extending track 44 possessing the track flange 45. The portion of the switching means which is pivotable about the pivot axis 41, apart from both connection members 37 and 39, will be seen to consist of a short pivot arm member 46 possessing a suitable bore for receiving a pin member 47. This pin member 47 is connected by a bracket 48 to a profile member 49 extending parallel to the pivot axis 41. Profile member 49 is supported via a number of oscillating dampening members 50 upon an angle member 51 secured in the brickwork 52. Both connection members 37 and 39 are held together by further components, such as the profile plate member 53, support means 54 and arm member 55 and form a stable structural unit. The mounting at the upper end of the movable portion occurs in association with a drive mechanism 56 secured to the track 44, such drive mechanism 56 being for instance a pivotable motor drive, the shaft member 57 of which is fixedly connected with the bracket means 58 of the movable portion or member of the switch means and, further, is mounted in a bracket 59 which, in turn, is secured to the profile member 49. Both of the vertically extending tracks 35 and 44 are likewise secured by means of the support 60 and 61, respectively, to the profile member 49. The pivot axis 41 of the movable portion heretofore disclosed is formed, on the one hand, by the pin member 47 and, on the other hand, by the shaft member 57.

Continuing, it will be observed that the horizontally extending track 42 is likewise secured via dampening elements with a support 62 at a building portion 63. By virtue of the provision of oscillating dampening members, there is prevented the transmission of oscillations to the building portion, and thus, the dissemination of noises.

With the arrangement of the components as shown in FIG. 10 there is possible a throughpassage of the conveying car or transport unit via the rail flanges 36, 38 and 43. In order to assure for a faultless alignment of the rail joints, an engagement or locking mechanism is provided at the transition location onto the horizontal track 42, this engagement or locking mechanism embodying an angle member 65 provided at the track 42 and a locking or engagement pin member 66 which can be actuated and engages with the angle member 65, such locking or engagement pin member 66 being supported at the connection member 37. Furthermore, it will be understood that the components 65 and 66 could be reversed, so that the locking pin member 66 is located at the track 42 and the angle member 65 at the connection member 37.

Figure 12:
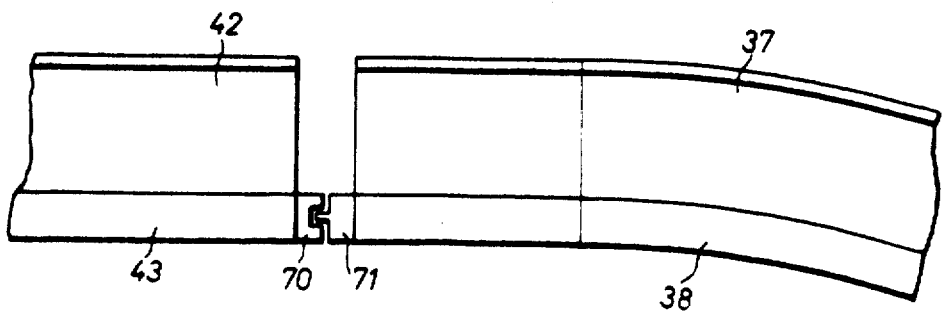
FIG. 12 depicts a rail joint of a horizontal rail with a connection member of a switch means.
Figure 13:
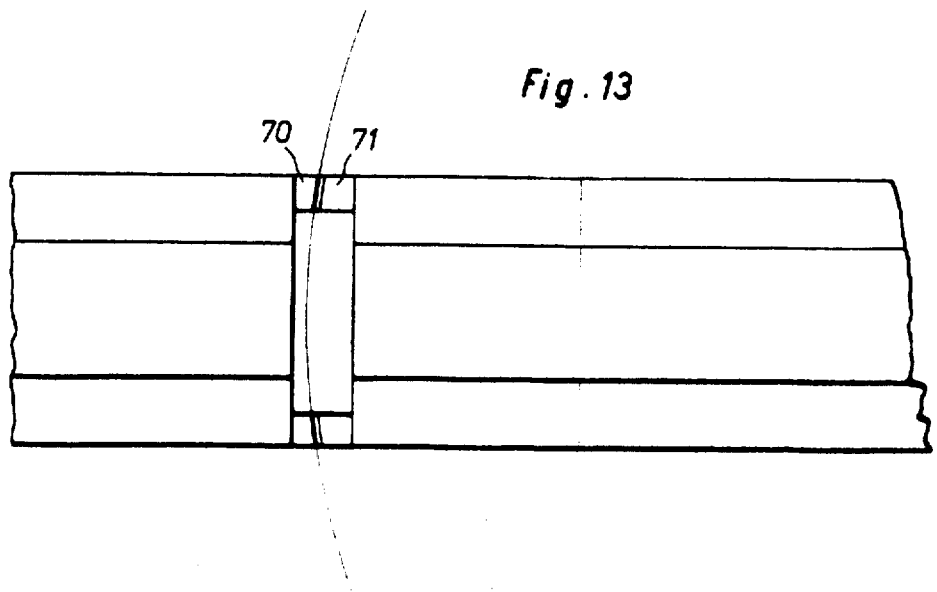
FIG. 13 is a plan view of the rail joint depicted in FIG. 12.
Figure 20:
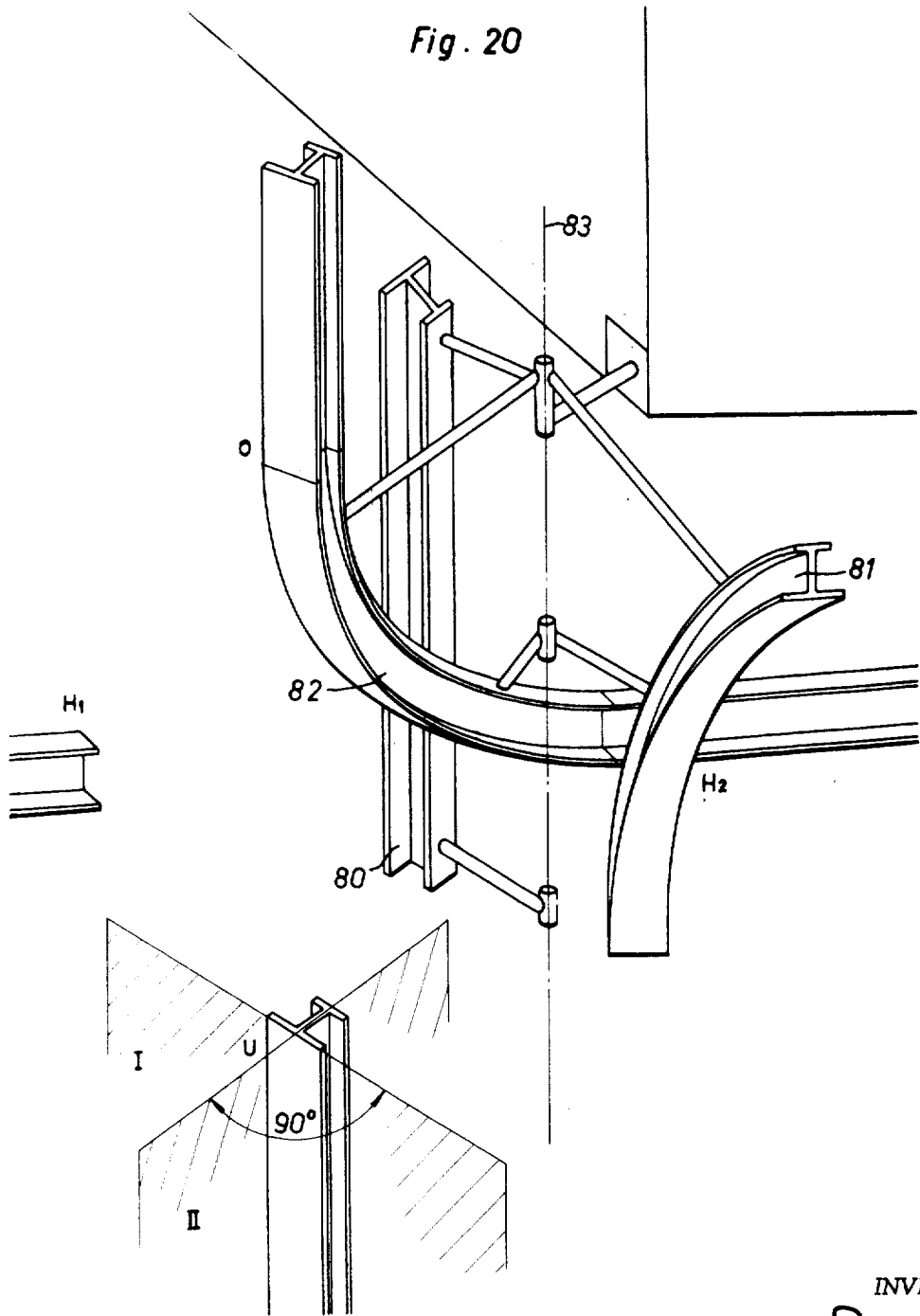
FIG. 20 is a schematic, perspective view of a vertically arranged switch means possessing three movable connection members.
Figure 22:
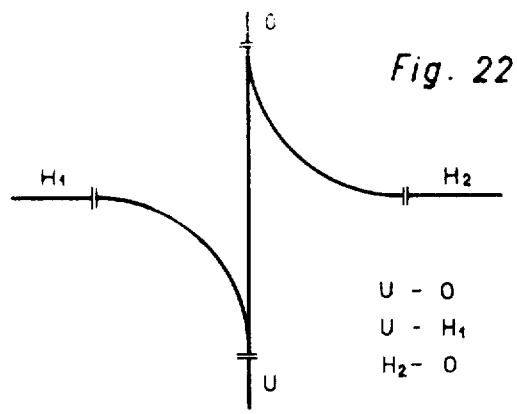
FIG. 22 is a schematic representation of the throughpassage possibility for the switch arrangement of FIG. 20.
Figure 21:
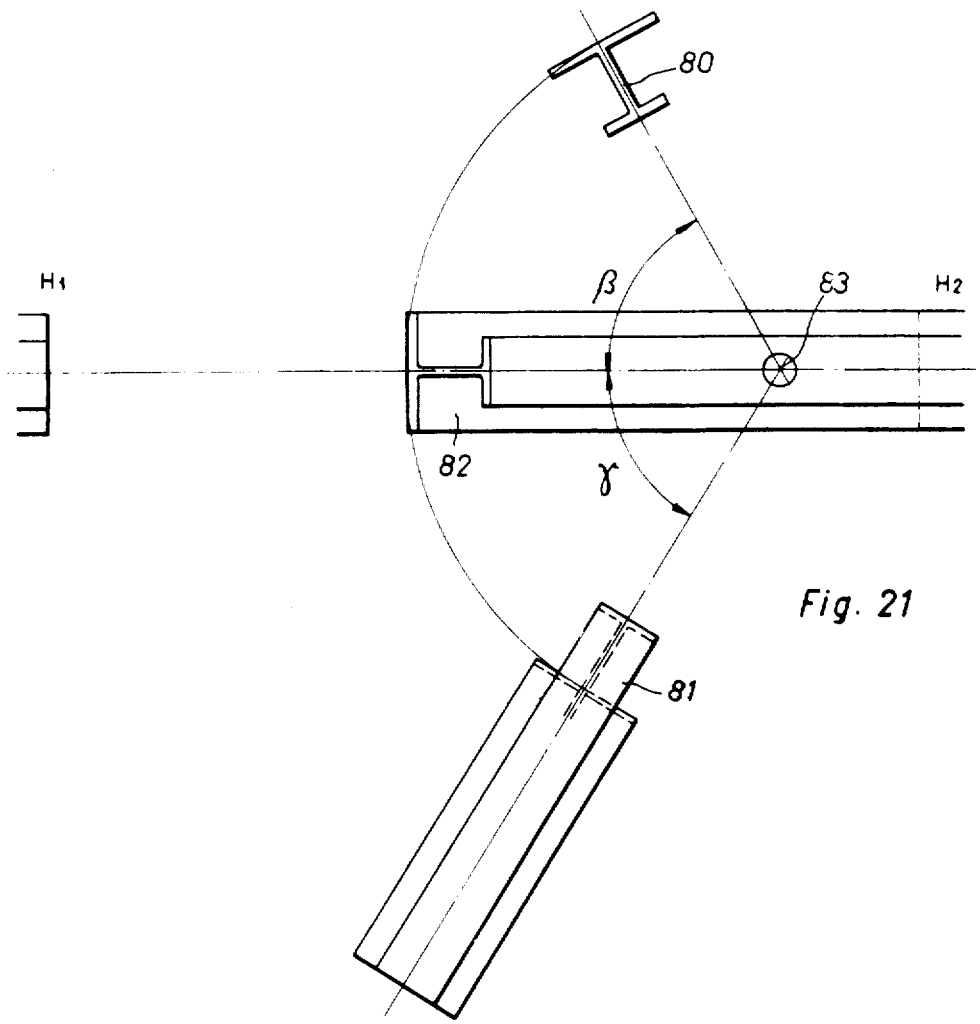
FIG. 21 is a plan view of the switch means or arrangement of FIG. 20.

Although when using two connection members it would be possible to employ instead of the locking mechanism just described also two simple lateral stop members for achieving an exact alignment of the track or rail joints, when three or more connection members are used, such as in the arrangement of FIGS. 20-22, there are advantageously employed locking mechanisms of the type heretofore considered. In order that the joints of the track flanges also will be in alignment when the load travels thereupon, the arrangement shown in FIGS. 12 and 13 provides for a mutual engagement of the track joints. To this end, the gap between the track 42 and the connection member 37 is bridged by the groove member 70 and resilient member 71, defining a tongue and groove arrangement, and which are provided at the relevant rail or track flanges 43 and 38, respectively, as shown. By the provision of appropriate teeth means at the groove 70 and resilient member 71, there is achieved that both track flanges 38 and 43, also when there passes a load, will be in alignment. When using the so-called oscillating switch means the members 70 and 71 are advantageously arranged along a circle 72 disposed concentrically with respect to the axis of rotation of such switch means.

FIGS. 14-19 schematically illustrate the throughpassage possibilities for switch means having two differently arranged movable connection members. Thus, it will be observed that in the arrangement of FIGS. 14 and 15 the branch or junction point is located at the vertical rail or track, whereas for the arrangement of FIGS. 18 and 19 such branch point is disposed at the horizontal rail. The momentary arrangement of the connection members is determined by the requirements of the conditions which are encountered.

Figure 16:
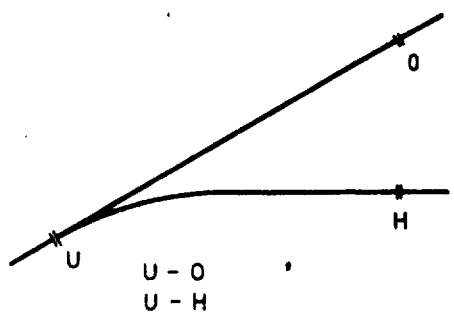
Figure 17:
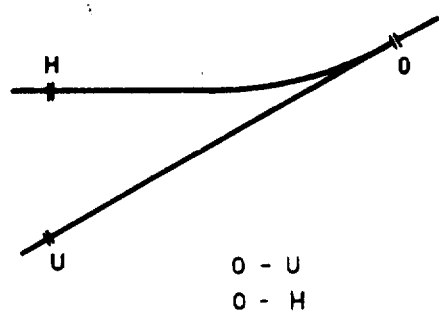
Figure 18:
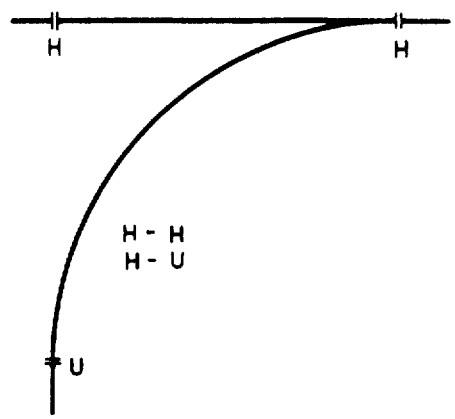

FIGS. 16 and 17 illustrate quite clearly that the switch means is in no way solely limited to a vertical and horizontal arrangement of the tracks, rather can be used for optionally arranged inclined track elements. If an oscillating-type switch means is employed, then the pivot axis can be disposed parallel to that track without directional change. In the schematic showing of throughpassage possibilities depicted in FIGS. 14-19, the indicated letters designate the possible throughpassage possibilities, and wherein the letter O signifies the upward direction, the letter U the downward direction, and the letter H the horizontal direction.

FIGS. 20-22, inclusive, serve to explain the mode of operation of a switch means in vertical arrangement, this switch means being constructed as a oscillating or pivotal switch means and having three connection members. The following throughpassage possibilities are available with this type arrangement:

a. from the lower to the upper vertical track, in the direction U-O, with the help of the connection member 80;

b. from the lower vertical track to a horizontal track, in the direction U-H1, with the help of the connection member 81; and c. from the other horizontal track to the upper vertical track, in the direction H2-0, with the aid of the connection member 82.

The three connection members 80, 81 and 82 are pivotable about an axis of rotation 83 arranged parallel to the vertical tracks. The angles $\beta$ and $\alpha$, between the planes II containing the rail axes and perpendicular to the track surfaces I, are advantageously smaller than 90°, so that the total angle $\beta + \alpha$ is smaller than 180°.

The connection members can also be arranged differently than that shown in FIGS. 20 and 22. When such is the case other throughpassage possibilities can be achieved. Furthermore, the pivot axis can be differently arranged, for instance can extend at an inclination.

Figure 23:
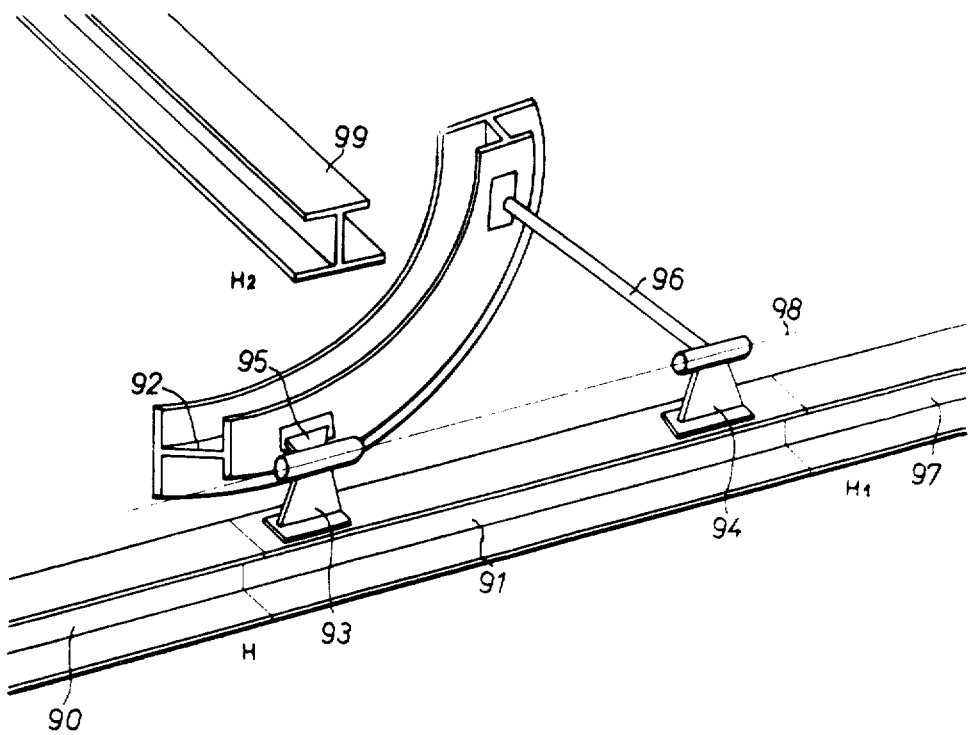
FIG. 23 is a schematic, perspective illustration of a horizontally arranged switch means incorporating two movable connection members, wherein the linear connection piece is disposed in its operational position.

FIGS. 23-25 inclusive illustrate a switch means for a branch point utilizing only horizontally disposed rail tracks, and specifically, wherein such switch means is constructed as a pivotable or oscillating switch. It will be understood that reference number 90 designates a horizontally extending rail track, at the end of which, as shown, there is located the branch point. The connection members 91 and 92, which are pivotably mounted by means of their supports 93, 94 and 95, 96, respectively, about an axis 98 extending parallel to the track 90 as well as the track 97, connect the track 90 either with the track 97 or with the further horizontally extending track 99.

FIG. 25 illustrates graphically the throughpassage possibilities as such are available for the position of the components shown in FIGS. 23 and 24, wherein the reference characters H, H₁ and H₂ coincide with the relevant reference characters appearing in FIGS. 23 and 24.

Moreover, this switch means which has been constructed as a pivotable or oscillating switch arrangement for interconnecting horizontally disposed rail tracks, could also be constructed as a rotary switch or as a slide switch.

Figure 19:
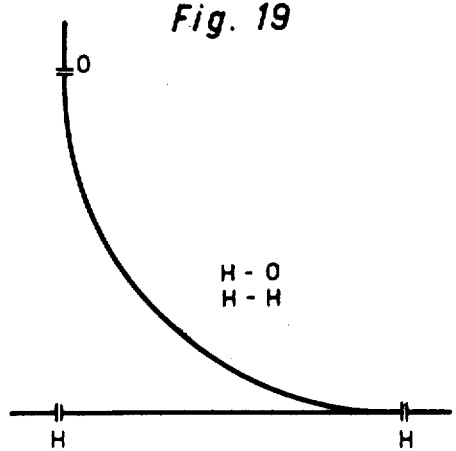

FIG. 26 depicts a switch arrangement constructed as a rotary-type switch, the throughpassage possibilities of which corresponds to those represented graphically in FIG. 19. It will be seen that the branch point is located at the end of the horizontal rail track 100 and the movable portion or component of the switch means connects the track 100 either with the vertical track 101 or with a horizontal track 102. To this end, the connection members 103 and 104 together with their supports 105–110 are mounted for rotation about the axis of rotation 111.

Figure 14:
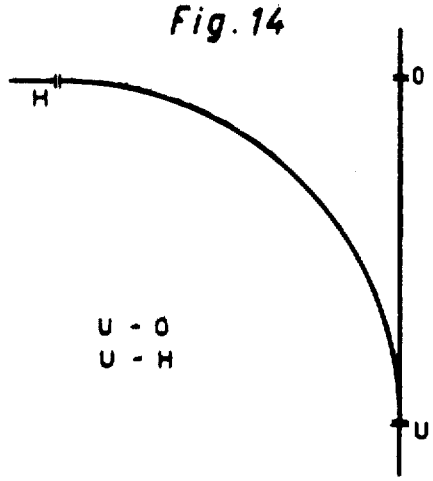
FIGS. 14-19 inclusive schematically illustrate different throughpassage possibilities for switch means containing two differently arranged movable connection members.
Figure 15:
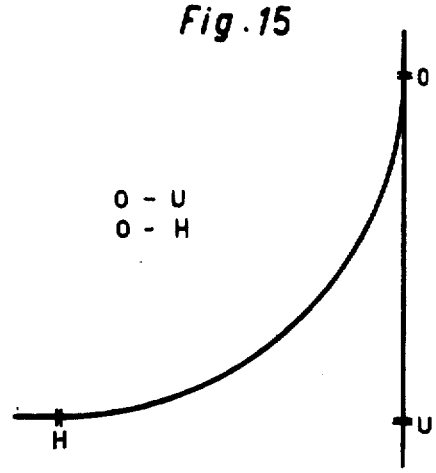

Finally, in the arrangement of FIG. 27 there is depicted a slide-type switch means for carrying out the throughpassage possibilities depicted in FIG. 14. At the end of the vertical track 115 there is located the branch point and the movable portion or component of the switch means connects the track 115 either with a horizontal track 116 or with a vertical track 117. By performing a sliding motion the momentarily required connection member 117 or 118 is placed into its desired operational position. The connection members 117 and 118 are secured to a frame means 114, 119–121, at which there are located the guide means 122–125 which are displaceably guided upon the slide rods 127 and 128. The sliding-type switch means of FIG. 27, insofar as its possible operational positions are concerned, corresponds to those of the oscillating-type switch means of FIGS. 1–5, inclusive, and FIGS. 10 and 11. Thus, it is possible to construct as oscillating-, sliding-, or rotary switches, all switch means with the described arrangement of the connection members, which in contrast to the known switch means possessing "planar" arrangement of the connecting members, can be designated as a switch means with a "spatial" arrangement of the connection members.

Instead of using the mentioned double-T-profile, it is possible for the rail track to possess a different profile, for instance an inverted T profile or a U-shaped profile with downwardly depending legs, at which there are arranged inwardly or outwardly directed traveling flanges.

While there is shown and described present preferred embodiments of the invention, it is to be distinctly understood that the invention is not limited thereto but may be otherwise variously embodied and practiced within the scope of the following claims. Accordingly,

What is claimed is:

1. A transportation installation of the type comprising selectively any one of a number of either horizontally, vertically or inclined extending track rail means, or combinations thereof, said track rail means having track surfaces and embodying a plurality of rail members along which there is adapted to travel a number of transport units having drive means and means for receiving a load, junction points having switch means provided for said track rail means, said switch means including movable means incorporating connection rail means having track surfaces and provided for said track rail means, said connection rail means deviating from one another with respect to their position, said connection rail means likewise having their track surfaces deviating from one another, each connection rail means including support means for said track surface, said support means incorporating a second surface, and further wherein each second surface incorporates a respective plane taken perpendicular to the associated track surface and parallel to the associated track axis of each associated connection rail means and said planes also deviate with respect to one another.

2. A transportation installation as defined in claim 1, wherein said respective planes containing said track axes perpendicular to said track surfaces of said connection rail means of said track rail means intersect along a predetermined axis.

3. A transportation installation as defined in claim 1, wherein said respective planes containing said track axes are perpendicular to said track surfaces of said track rail means, and wherein the line of intersection of said respective planes forms a pivot axis for said movable means of said switch means so that the individual connection rail means of said track rail means can be selectively pivoted about said pivot axis in order to be placed into a throughpassage position for the transport units or out of such throughpassage position.

4. A transportation installation as defined in claim 1, further including means defining a pivot axis for said movable means of said switch means, said pivot axis being located outside of said respective planes containing said track axes which are perpendicular to said track surfaces.

5. A transportation installation as defined in claim 1, wherein said respective planes which are perpendicular to said track surfaces and containing said track axes extend substantially parallel to one another.

6. A transportation installation as defined in claim 5, further including means for slideably displacing said connection rail means of said track rail means into a throughpassage position or out of the latter for said transport units.

7. A transportation installation as defined in claim 5, further including means cooperating with said connection rail means for rotating said connection rail means selectively into and out of an operational position about an axis of rotation disposed between said connection rail means and parallel to said planes containing said track axes and perpendicular to the track surfaces of said connection rail means.

8. A transportation installation as defined in claim 1, wherein said connection rail means comprise two connection rail members, and means for pivotably mounting said two connection rail members through a pivot angle which is less than 90°.

9. A transportation installation as defined in claim 1, wherein said connection rail means comprises three connection rail members, and means for pivotably mounting said three connection rail members through an angle which is less than 180°.

10. A transportation installation as defined in claim 1, wherein the confronting region between said track rail means and said connection rail means defines a rail joint, and means provided for said rail joint defining a groove-resilient connection arrangement for the purpose of retaining together said rail joint upon passage therethrough of a load.

11. A transportation installation as defined in claim 1, wherein the confronting region of said track rail means and said connection rail means of said movable means of said switch means defines a rail joint, and locking means ensuring for the lateral alignment of said rail joint.

12. A transportation installation as defined in claim 1, wherein the confronting region between said connection rail means and the neighboring track rail means defines a rail joint, and fixed stop means ensuring for the lateral alignment of said rail joint.

* * * * *